(12) United States Patent
Harmke

(10) Patent No.: US 8,909,173 B2
(45) Date of Patent: Dec. 9, 2014

(54) METHOD AND APPARATUS FOR OPERATING ACCESSORY INTERFACE FUNCTIONS OVER A SINGLE SIGNAL

(75) Inventor: Charles B. Harmke, Huntley, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 274 days.

(21) Appl. No.: 13/538,561

(22) Filed: Jun. 29, 2012

(65) Prior Publication Data

US 2014/0004807 A1    Jan. 2, 2014

(51) Int. Cl.
*H04B 1/38* (2006.01)
*H04M 1/725* (2006.01)

(52) U.S. Cl.
CPC ...... *H04M 1/72527* (2013.01); *H04M 1/72547* (2013.01)
USPC ...... 455/90.2; 455/3.06; 455/41.1; 455/556.1

(58) Field of Classification Search
CPC .................... H04M 1/72527; H04M 1/72502; H04M 1/72505; H04M 1/72513; H04M 1/72519; H04M 1/72522; H04M 1/72547; H04M 1/738; H04M 1/7385
USPC ........ 455/518, 519, 90.2, 557, 558, 559, 418, 455/420, 68, 556.1, 575, 123, 350, 351, 455/11.1; 710/8, 9, 10, 15, 72; 327/50, 385, 327/365; 381/120, 84, 59, 58, 71.6; 704/226
See application file for complete search history.

(56) References Cited

U.S. PATENT DOCUMENTS

| | | | |
|---|---|---|---|
| 4,654,881 A * | 3/1987 | Dolikian et al. | 455/70 |
| 5,118,309 A | 6/1992 | Ford | |
| 5,649,307 A * | 7/1997 | Patino | 455/90.2 |
| 5,936,581 A * | 8/1999 | Roshitsh et al. | 343/702 |
| 5,995,633 A | 11/1999 | Cappels et al. | |
| 6,031,767 A | 2/2000 | Schuh et al. | |
| 6,038,457 A | 3/2000 | Barkat | |
| 6,088,754 A | 7/2000 | Chapman | |
| 6,902,412 B2 | 6/2005 | Higgins | |
| 6,961,790 B2 | 11/2005 | Swope et al. | |
| 7,424,312 B2 * | 9/2008 | Pinder et al. | 455/557 |
| 7,526,317 B2 * | 4/2009 | Pinder et al. | 455/557 |
| 7,643,642 B2 * | 1/2010 | Patino et al. | 381/120 |

(Continued)

FOREIGN PATENT DOCUMENTS

WO    2005033846 A2    4/2005
WO    2006014922 A2    2/2006

OTHER PUBLICATIONS

International Search Report and Written Opinion for International Patent Application No. PCT/US2013042233, mailed Jul. 9, 2013.

(Continued)

*Primary Examiner* — Tan Trinh
(74) *Attorney, Agent, or Firm* — Barbara R. Doutre

(57) ABSTRACT

An interface (100) is provided between an accessory (102) and a radio (104) to enable three functions over a single signal line (140) thereby minimizing pin count in a connector (112). The functions of accessory detect, one-wire memory and accessory PTT press are controlled over the single signal line (140) through the use of two comparators (116, 118) and two voltage dividers (106, 108, 110).

17 Claims, 4 Drawing Sheets

(56) References Cited

U.S. PATENT DOCUMENTS

| | | |
|---|---|---|
| 7,769,939 B2 | 8/2010 | Zhou et al. |
| 2008/0032624 A1* | 2/2008 | Abraham ............... 455/11.1 |
| 2009/0180353 A1* | 7/2009 | Sander et al. ............ 367/197 |
| 2010/0235554 A1 | 9/2010 | Chang et al. |
| 2011/0199123 A1* | 8/2011 | Maher et al. ............ 327/50 |
| 2012/0019306 A1* | 1/2012 | Turner et al. ............ 327/385 |
| 2012/0021700 A1* | 1/2012 | Beghini et al. .......... 455/90.2 |
| 2014/0081631 A1* | 3/2014 | Zhu et al. ............... 704/226 |

OTHER PUBLICATIONS

Motorola, Inc.—Saber (trademark)—Handie-Talki Portable Radios—Theory/Masintenance Manual—68P81044C05-A; Audio Accessories—Theory of Operation. Detailed Circuit Description—5 pages—see p. 7—1989-1990.

Motorola Solutions—Remote Speaker Microphones "Ease Communications With Enhanced Audio Capabilities"—Downloaded Jun. 21, 2012—http://www.motorola.com/Business/US-EN/Business+Product+and+Services/Accessories—8 pages.

* cited by examiner

METHOD AND APPARATUS FOR OPERATING ACCESSORY INTERFACE FUNCTIONS OVER A SINGLE SIGNAL

FIELD OF THE INVENTION

The present invention relates generally to communication devices and more particularly to an accessory interface for reducing signal and pin count to a portable radio.

BACKGROUND

Communication devices, such as portable two-way radios, are often operated in conjunction with a wired accessory device. Users of such devices typically work in public safety environments, such as law enforcement, fire, rescue, security and the like. In operation, the portable radio is typically carried at the user's side on a belt clip, while the accessory device is fastened at the shoulder. These accessory devices allow remote control of one or more radio functions, such as push-to-talk (PTT), accessory detect, speaker, and microphone to name a few.

Smaller, lighter, and slimmer form factors are continually being sought to make the accessory device easier to wear, operate, and even conceal. However, with so many functions being remoted to the accessory, it can be challenging for designers to reduce the overall accessory size and weight. As such, designers are left with the challenge of seeking out creative avenues for reducing the size, parts count and overall cost of accessory devices. The interface between the accessory and radio which handles the numerous remote functions is particularly problematic as pin count directly impacts the size and cost of the interface. Additionally, public safety products are utilized in environments where contacts risk incurring damage from exposure.

Accordingly, there is a need for an improved interface between the accessory and radio.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
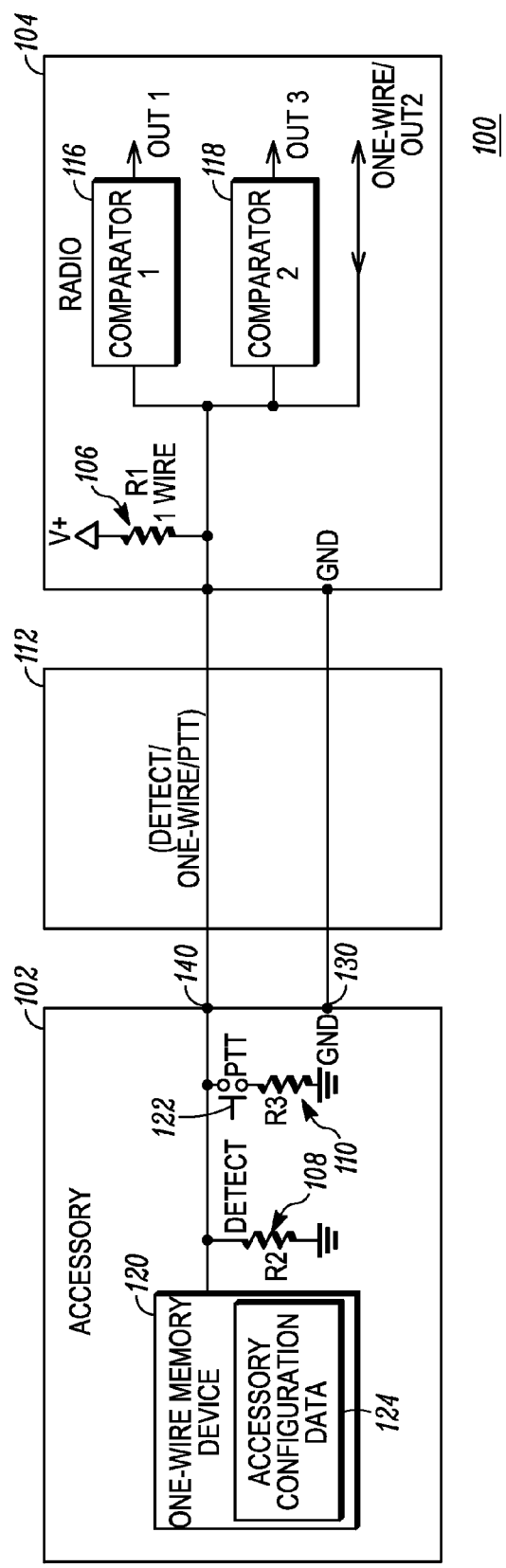
FIG. 1 is a block diagram of a radio and accessory interface in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in an apparatus and method for interfacing an accessory to a radio. By multiplexing accessory functions to a single signal line, the interface is minimized in terms of contacts, thereby permitting a smaller form factor and reduced cost.

Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Briefly, there is provided herein an interface for an accessory and a radio which enables three functions over a single signal line. The functions of accessory detect, one-wire memory and accessory push-to-talk (PTT) press are multiplexed over the single signal line through the use of voltage dividers and comparators. A one-wire memory device is located in the accessory and provides accessory configuration data as described in U.S. Pat. No. 7,526,317 hereby incorporated by reference. The interface, provided in accordance with the various embodiments, provides an enhancement by combining three functions on to a single signal one-wire data line thereby reducing size, parts count and overall cost.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a block diagram of an interface system 100 in accordance with the various embodiments. Interface system 100 provides an interface between an accessory 102 and a portable two-way radio 104 coupled via an external interface, such as a connector 112. Accessory 102 comprises an embedded memory device 120 selected to have a serial interface that minimizes the pin count of connector 112. Many different types of serial memory devices are available, such as a single wire 1-Wire™ device from Dallas Semiconductor, a two wire I²C™ device available from Phillips Electronics, or a three wire Serial Peripheral Interface (SPI) memory device to name but a few. The serial interface provides bi-directional data and optionally clock signals to and from the serial memory device. In the preferred embodiment of the invention, the embedded memory device 120 is a single wire memory device, such as the 1-Wire™ serial EEPROM.

The embedded memory device 120 contains accessory configuration data 124 which provides information to the radio 104 on how to configure external interface 112 and how to operate accessory 102. Accessory configuration data 124 contains exactly one accessory identifier, at least one physical configuration descriptor and at least one event mapping descriptor. The accessory identifier is used to uniquely identify the type or model of accessory 102. The physical configuration descriptor (PCD) provides port configuration information via a single descriptor. The event mapping descriptor provides the link between physical interface lines and actual radio functionality. For input events to the radio, the event mapping descriptor determines what happens when a particular input line is activated or deactivated. For output events from the radio, the event mapping descriptor controls the output lines based on internal radio events or states.

In accordance with the various embodiments, radio interface 104 comprises a first comparator 116, a second comparator 118, and a pull-up resistor 106. Accessory interface 112 comprises the one-wire memory device 120, a pull-down resistor R2 108, and a PTT switch 122 with pull-down resistor R3 110.

At the radio interface 104, a signal 140 is pulled high via the resistor R1 106. At the accessory interface 102, the signal 140 is pulled to ground via resistor R2 108. When the accessory interface 102 is attached to the radio interface 104 via connector 112, the voltage observed at the signal 140 is voltage V1, with V1 being determined by voltage divider (where V is the source voltage $V^+$ as shown in the radio interface 104):

$$V1 = V \frac{R2}{R1 + R2}$$

In accordance with the various embodiments, voltage V1 is detected by the radio interface 104 using the first comparator 116. The voltage level V1 at signal 140 thus provides an accessory detect function.

When the accessory PTT switch 122 is pressed, a resistor R3 110 is switched in parallel with resistor R2 108, resulting in voltage V2 at the signal 140:

$$V2 = V \frac{\frac{R2 \times R3}{R2 + R3}}{R1 + \frac{R2 \times R3}{R2 + R3}}$$

In accordance with the various embodiments, voltage V2 is detected by the radio interface side 104 using the second comparator 118. The voltage level V2 at signal 140 thus provides an accessory PTT function. The radio interface side 104 will ignore PTT-presses until the one-wire memory device 120 has been read, as described next.

At the accessory interface 102, the one-wire memory device 120 is also coupled to the signal 140. In accordance with the various embodiments, voltage V2 must be greater than the one-wire bus minimum input high voltage and the minimum pull-up voltage for one-wire memory device 120.

In accordance with the various embodiments, the radio interface 104 reads the data from the one-wire memory device 120 over signal 140. The accessory one-wire function provides configuration information pertaining to the accessory which allows the radio to adjust parameters, thresholds, and the like specific to the attached accessory. The data at signal 140 thus provides an accessory one-wire function.

Thus, a single signal line 140 is now able to provide accessory connect/disconnect status, PTT press/no-press status, and type of one-wire accessory device. An example of resistor and voltage values is provided below. Different values, tolerances and ranges may be utilized depending on the radio and accessory specification requirements.

| Status of Single Line/Contact (R1 = 2.2 kΩ, R2 = 7.15 kΩ, R3 = 11.3 kΩ, $V^+$ = 5 V) | Voltage (V) Measured at signal line 140 |
|---|---|
| Accessory Detached | 5.0 |
| Accessory Attached/no PTT press | 3.82 |
| Accessory PTT-press/no one-wire activity) | 3.33 |
| One-Wire Bus Logic High | 3.82 or 3.33(PTT pressed) |
| One-Wire Bus Logic Low | 0 |

Figure 2:
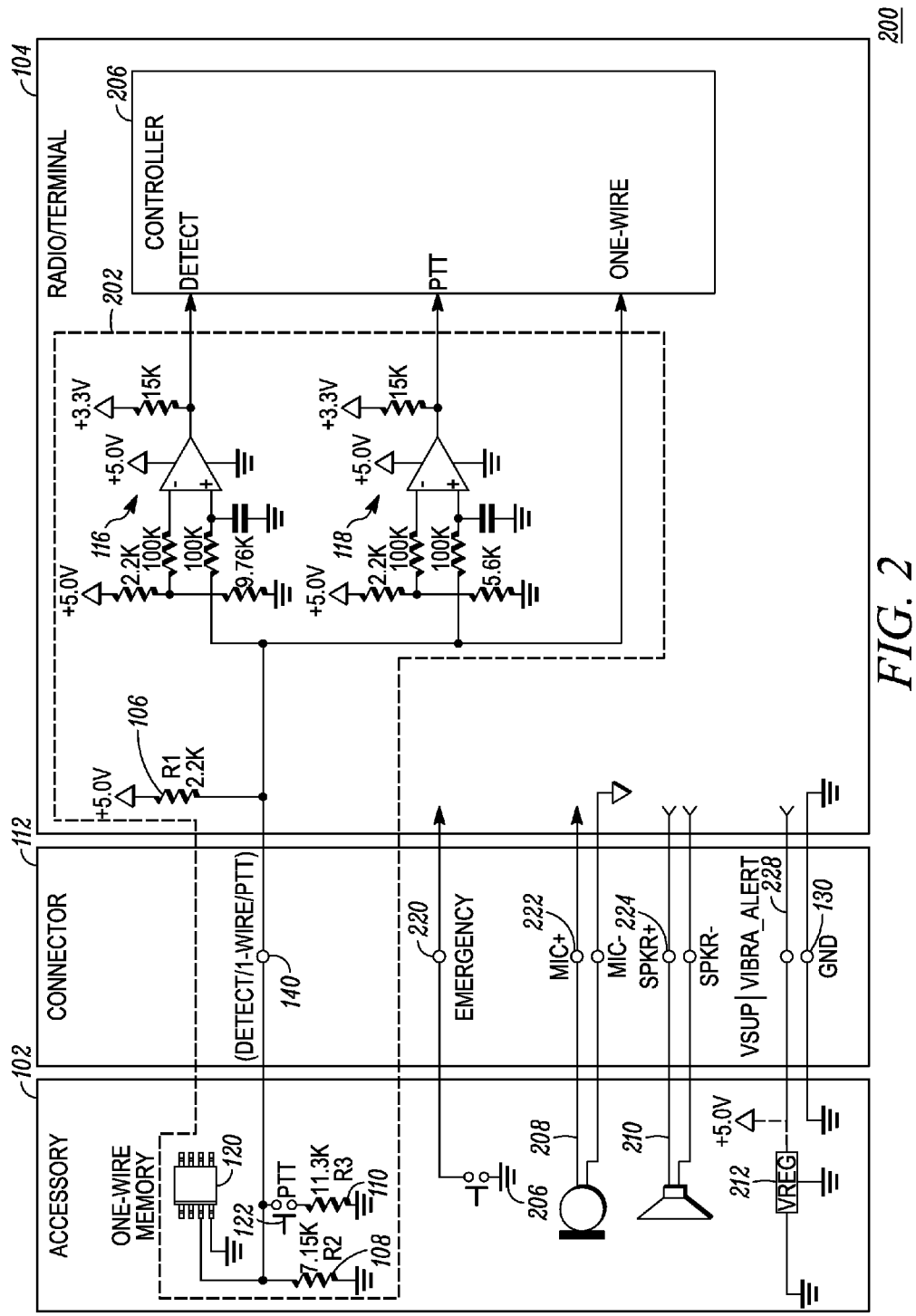
FIG. 2 is a schematic diagram of a radio and accessory interface in accordance with the various embodiments.

FIG. 2 is a schematic diagram 200 for implementing a radio and accessory interface 202 for radio 104, connector 112 and accessory 102 in accordance with the various embodiments. Radio 104 contains a microcontroller 206 with a configurable general purpose input output (GPIO) interface, also referred to as radio controller 206. GPIO pins with bi-directional capability—software programmable to function as either an input or an output—are connected through external interface connector 112. Upon power-up of radio 104 the GPIO pins are configured to a default, inert configuration where all pins are configured as inputs.

In accordance with the various embodiments, upon accessory detection over single signal line 140, the radio 104 reads the contents of embedded memory device 120, also over single signal line 140. Once the contents of the embedded memory device 120 are read and any radio configurations completed, PTT presses can now be detected on the single signal line 140. The radio controller 206 is programmed to ignore PTT presses until the contents of the embedded memory device 120 device have been read.

Interface 202 shows the sample component values discussed in conjunction with FIG. 1, however these values (e.g. voltage levels, resistor values, etc.) may be modified depending on the operational requirements of the system. As in FIG. 1, the interface 202 comprises R1 106, R2 108, R3 110, and one-wire memory device 120 along with first and second comparators 116, 118 (along with respective biasing components) to provide the functions of detect, one-wire, and PTT over single signal line 140 in accordance with the various embodiments. Comparators 116, 118 may comprise open drain/collector outputs, such as low-voltage rail-to-rail operational amplifiers known in the art. The interface 202 facilitates remote control of accessory detect, one-wire, and PTT over single signal line 140.

In operation, when no accessory is attached to the radio 104, resistor R1 106 pulls the positive (+) input terminal of comparator 116 up to 5 volts. The negative input terminal to first comparator 116 is 4.08 volts. Likewise, resistor R1 106 pulls the positive (+) input terminal of second comparator 118 to 5 volts. The negative input terminal to second comparator 118 is 3.59 volts. The outputs of both comparators are thus 3.3 volts (i.e., logic level high) which are ignored by the controller 206. This mode may be referred as device mode or radio alone mode, wherein the controller 206 is programmed to ignore any accessory inputs other than a detect input of a predetermined level.

In operation, when accessory 102 is attached to the radio 104 via connector 112, the positive (+) input terminal of the first comparator 116 is 3.82 volts (V1) while the negative input terminal is 4.08 volts thereby generating a first comparator 116 output of 0 volts (i.e., low logic level). Meanwhile, the positive (+) input terminal of the second comparator 118 is 3.82 volts while the negative input terminal is 3.59 volts thereby generating a second comparator 118 output of 3.3 volts (i.e., high logic level). The first comparator's output terminal being logic level low enables detect at the controller 206. The controller 206 is programmed to detect standard CMOS logic levels. The controller 206 is further programmed to ignore voltages on either its PTT input or one-wire input until detect has been satisfied. Thus, first comparator 116 is the comparator that detects accessory attachment in response to voltage V1.

Now that the accessory 102 has been detected and identified, accessory PTT presses can be detected. When the accessory PTT switch 122 is pressed, resistor R3 110 is switched in parallel with resistor R2 108, resulting in voltage V2 at the signal 140, as described earlier in conjunction with FIG. 1.

Voltage V2 on signal 140 is present on the positive (+) input terminal of the first comparator 116 is 3.33 volts while the negative input terminal is 4.08 volts, thereby generating a first comparator 116 output of 0 volts (i.e., low logic level) in response to V2.

Meanwhile, the positive (+) input terminal of the second comparator 118 is also 3.33 volts and the negative (−) terminal is 3.59 volts, thereby generating a second comparator output of 0 volts (i.e., low logic level).

The controller 206 is programmed such that PTT presses will only be recognized at second comparator 118 after the accessory attachment has been detected and one-wire memory read of the accessory has been completed. Thus, second comparator 118 is the comparator that detects PTT presses in response to voltage V2.

In accordance with the various embodiments, voltage V2 must be greater than the one-wire bus minimum input high voltage and the minimum pull-up voltage for one-wire memory device 120. In accordance with the various embodiments, other control functions, such as the emergency switch 206, could also be coupled via a voltage divider (generating a voltage V3) to a third comparator and coupled to the single signal line 140, as long as appropriate voltage ranges and tolerances are maintained. This would eliminate the emergency contact 220 further minimizing the number of contacts pins used in connector 112.

Functions remoted to separate lines of the accessory 106 may comprise microphone 208, speaker 210 and alert 212 interfaced through connector contacts comprising mic+/− contacts 222, speaker+/−contacts 224 and alert contact 228 respectively.

Figure 3:
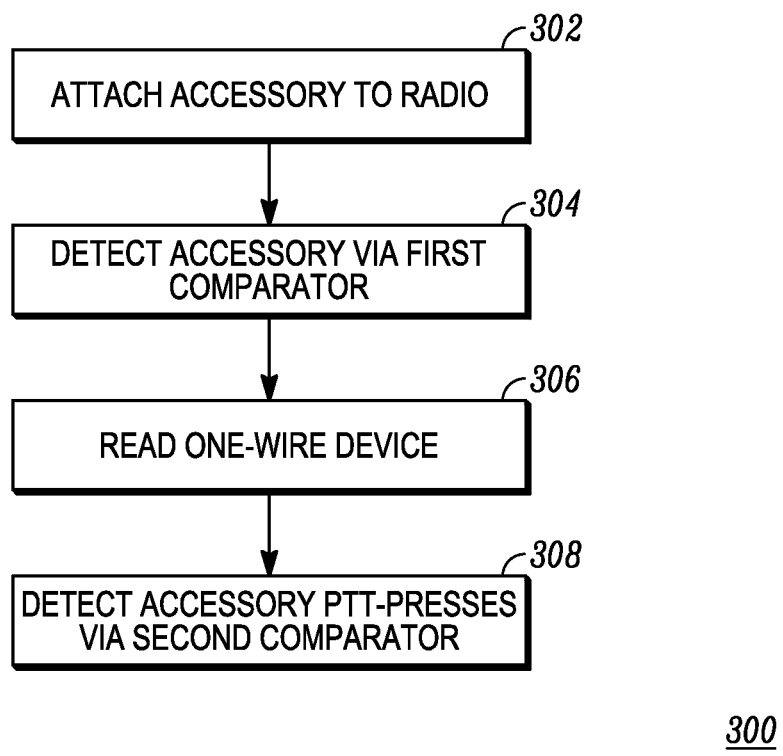
FIG. 3 is a method of interfacing an accessory to a portable radio in accordance with the various embodiments.

FIG. 3 is a method 300 of interfacing an accessory to a portable two-way radio in accordance with the various embodiments. Beginning at 302, an accessory formed in accordance with the various embodiments is attached to a radio, via a plurality of interface contacts. At 304, a first comparator of the radio detects the accessory via a single line output of the accessory. In response to the accessory being detected at 304, accessory configuration data from a one-wire memory device of the accessory is read by the radio via the single line output of the accessory. The reading of the one-wire memory device at 306 by the radio allows the radio to determine the identification and accessory type, such as remote speaker microphone (RSM), public safety microphone (PSM), to name a few. At 308, PTT presses are detected via the single line output of the accessory by a second comparator located in the radio. PTT presses which occur prior to the one-wire memory device being read are ignored, thereby ensuring that proper voltage levels and thresholds are set. Thus, the order of operation comprises detecting the accessory, reading the one-wire memory device of the accessory, and detecting PTT presses of the accessory.

Figure 4:
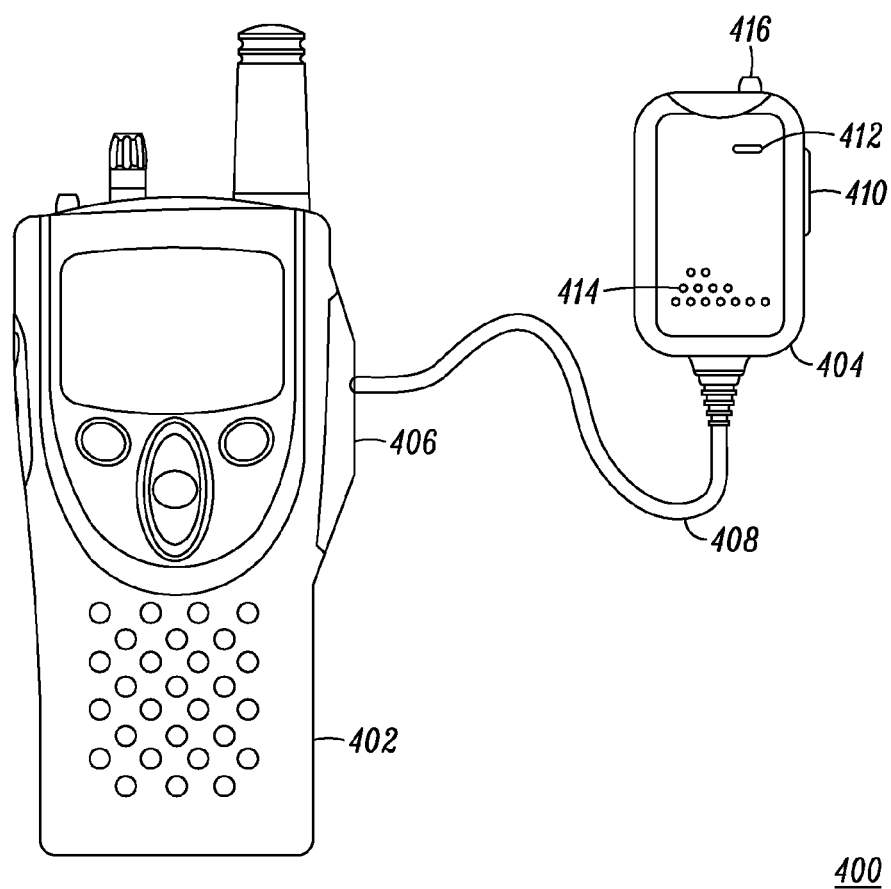
FIG. 4 is shows an interface between an accessory to a portable radio in accordance with the various embodiments.

FIG. 4 shows a radio and accessory incorporating an example of an interface formed and operating in accordance with the various embodiments. Accessory 404 is coupled to radio 402 via a cable 408 and a connector 406. Radio 402 comprises transceiver and controller circuitry for simplex (also referred to as half-duplex) radio operation. Radio 402 further comprises the first and second comparator circuits as previously described. Accessory 404 comprises a one-wire memory device as previously described along with PTT switch 410. Connector 406 couples accessory 404 to the radio 402 via contacts, one of which provides a single line and contact interface which provides the functions of accessory detect, one-wire memory device reading, and push-to-talk (PTT)-press detection. Thus, three functions are provided over the single contact/line interface 140 as previously described. Accessory 404 remotes other functions as well, such as microphone 412, speaker 414 and emergency switch 416. Because a single interface signal handles the three functions of accessory detect, one-wire memory device, and PTT press, the connector 406 has a reduced number of pins compared to those previously available. The use of pull-down resistors and comparators minimizes the need for separate contacts and provides a high level of accuracy for thresholds over a wide range of temperature and operating conditions prevalent in a public safety environment.

Accordingly, there has been provided a new interface which controls three functions with a single signal line, thereby reducing the number of pins in a connector by two. PTT and one-wire functions are no longer mapped to separate signals/contacts which is particularly advantageous for products utilized in the public safety communications environment where potential contact exposure is sought to be minimized.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:
1. An interface system, comprising:
a radio having a controller;
a remote accessory having a memory device with accessory configuration data stored therein;
a single signal line for controlling three accessory functions between the radio controller and the remote accessory, the single signal line being pulled high when no remote accessory is attached to the radio, the single signal line being pulled to a first predetermined voltage in response to the remote accessory being attached to the radio indicating an accessory detection function, the controller reading the accessory configuration data over the single signal line in response to the remote accessory being detected, and the single signal line being pulled to a second predetermined voltage in response to push-to-talk (PTT) presses;
a first comparator in the radio for detecting attachment of the remote accessory; and
a second comparator in the radio for detecting accessory PTT presses after the accessory configuration data of the memory device has been read.

2. The interface system of claim 1, wherein the memory device is one-wire memory device.

3. An interface system, comprising:
a radio having a controller;
a remote accessory having a memory device with accessory configuration data stored therein;
a single signal line for controlling three accessory functions between the radio controller and the remote accessory, the single signal line being pulled high when no remote accessory is attached to the radio, the single signal line being pulled to a first predetermined voltage in response to the remote accessory being attached to the radio indicating an accessory detection function, the controller reading the accessory configuration data over the single signal line in response to the remote accessory being detected, and the single signal line being pulled to a second predetermined voltage in response to push-to-talk (PTT) presses; and
wherein accessory PTT presses are ignored by the radio controller until the remote accessory has been detected by the first comparator and identified by the accessory configuration data.

4. An interface system, comprising:
a radio having a controller;
a remote accessory having a memory device with accessory configuration data stored therein; and
a single signal line for controlling three accessory functions between the radio controller and the remote accessory, the single signal line being pulled high when no remote accessory is attached to the radio, the single signal line being pulled to a first predetermined voltage in response to the remote accessory being attached to the radio indicating an accessory detection function, the controller reading the accessory configuration data over the single signal line in response to the remote accessory being detected, and the single signal line being pulled to a second predetermined voltage in response to push-to-talk (PTT) presses;
and further comprising:
a pull-up resistor in the radio coupled to the single signal line;
a first pull-down resistor coupled to the memory device and the single signal line; and
a second pull-down resistor coupled to a PTT switch; and
the pull-up resistor and first pull-down resistor providing a first voltage divider generating the first predetermined voltage to indicate accessory detection, and the pull-up resistor and the first and second pull-down resistors forming a second voltage divider generating the second predetermined voltage for PTT press detection.

5. A method of interfacing an accessory to a radio, comprising:
coupling the accessory to the radio via a plurality of interface contacts;
detecting the accessory at a single contact via a first comparator of the radio;
reading a memory device, located in the accessory, at the single contact at the radio; and
detecting accessory push-to-talk (PTT) presses at the single contact via a second comparator of the radio;
further comprising ignoring accessory PTT presses until the memory device is read.

6. A method of interfacing an accessory to a radio, comprising:
coupling the accessory to the radio via a plurality of interface contacts;
detecting the accessory at a single contact via a first comparator of the radio;
reading a memory device, located in the accessory, at the single contact at the radio; and
detecting accessory push-to-talk (PTT) presses at the single contact via a second comparator of the radio;
wherein first and second voltage dividers provide first and second voltages to the single contact, the first voltage indicating accessory detection and the second voltage indicating PTT presses.

7. The interface of claim 6, wherein the memory device is one-wire memory device.

8. An interface system for an accessory and a radio, comprising:
an accessory interface, comprising:
a memory device containing accessory configuration data, the memory device having a first pull-down resistor coupled thereto;
a push-to-talk (PTT) switch having a second pull-down resistor coupled thereto;
a radio interface, comprising:
a first comparator having a pull-up resistor coupled to an input terminal;
a second comparator having an input terminal coupled to the pull-up resistor; and
the memory device, PTT switch, first pull-down resistor, second pull-down resistor, first comparator, and second comparator are operatively coupled via a single signal line, wherein:
the first comparator detects that the accessory is detached from the radio via the pull-up resistor, the first comparator detects a first voltage at the single signal line, wherein the first voltage is generated by a first divider formed of the pull-up resistor and first pull-down resistor, wherein the first voltage indicates that the accessory is being attached to the radio;
the accessory configuration data is read from the memory device over the single signal line in response to the remote accessory being detected; and
the second comparator detects a second voltage at the single signal line, wherein the second voltage is generated by a second divider formed of the pull-up resistor and the first and second pull-down resistors, wherein the second voltage indicates PTT presses.

9. The interface of claim 8, wherein the radio comprises a two-way radio operating within a public safety communication system.

10. The interface of claim 9, wherein the two-way radio is a portable handheld two-way radio and the accessory comprises a remote speaker microphone (RSM) or a public speaker microphone (PSM).

11. The interface of claim 8, wherein the accessory further comprises:
a microphone;
a speaker;
an emergency switch; and
an alert.

12. The interface of claim 8, wherein accessory PTT presses are ignored until the accessory configuration data of the memory device is read.

13. The interface of claim 8, wherein the memory device is one-wire memory device.

14. An interface system for an accessory and a radio, the interface comprising:
a controller at the radio;
a memory device at the accessory having accessory configuration data stored therein;

a first comparator at the radio for detecting accessory attachment and detachment, the controller reading the accessory configuration data from the memory device in response to an accessory being detected;

a second comparator at the radio for detecting accessory push-to-talk (PTT) presses, the accessory PTT presses being detectable by the second comparator only after the first comparator has detected accessory attachment and the controller has read the accessory configuration data; and wherein the accessory detect function, the accessory configuration data read function and the accessory PTT presses detect function are multiplexed over a single signal line.

15. The interface system of claim 14, wherein the first and second comparators are responsive to first and second voltage levels generated at the single signal line, the first voltage level indicating accessory attachment, and the second voltage level indicating a PTT press.

16. The interface system of claim 15, wherein the memory device is a one-wire memory device, and the accessory configuration data is read over the single signal line.

17. The interface system of claim 16, wherein the second voltage level generated in response to a PTT press is greater than a one-wire bus minimum input high voltage and a minimum pull-up voltage of the one-wire memory device.

* * * * *